United States Patent
Kitajima et al.

(10) Patent No.: US 11,850,538 B2
(45) Date of Patent: Dec. 26, 2023

(54) FILTER LIFE PREDICTING APPARATUS

(71) Applicant: YAMASHIN-FILTER CORP., Kanagawa (JP)

(72) Inventors: Nobuyuki Kitajima, Kanagawa (JP); Nobuki Sasaki, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 232 days.

(21) Appl. No.: 17/336,983

(22) Filed: Jun. 2, 2021

(65) Prior Publication Data

US 2021/0285803 A1 Sep. 16, 2021

Related U.S. Application Data

(63) Continuation of application No. PCT/JP2019/046956, filed on Dec. 2, 2019.

(30) Foreign Application Priority Data

Dec. 11, 2018 (JP) ................................. 2018-231947

(51) Int. Cl.
*B01D 35/143* (2006.01)

(52) U.S. Cl.
CPC .................................. *B01D 35/143* (2013.01)

(58) Field of Classification Search
CPC .............. B01D 35/143; B01D 35/1435; B01D 27/101; B01D 46/0086; B01D 2201/56
See application file for complete search history.

(56) References Cited

U.S. PATENT DOCUMENTS

| | | | |
|---|---|---|---|
| 8,352,200 B2 * | 1/2013 | Contini | B01D 37/046 |
| | | | 702/50 |
| 8,626,456 B2 * | 1/2014 | Moore | F02D 41/18 |
| | | | 702/45 |
| 10,610,818 B2 * | 4/2020 | Fox | B01D 46/0086 |
| 11,452,954 B2 * | 9/2022 | Lyon | B01D 46/444 |
| 2002/0060191 A1 | 5/2002 | Sutton et al. | |
| 2003/0226809 A1 * | 12/2003 | Zagone | F01M 11/10 |
| | | | 210/90 |
| 2011/0054811 A1 | 3/2011 | Contini et al. | |

(Continued)

FOREIGN PATENT DOCUMENTS

| JP | H01-61909 U | 4/1989 |
|---|---|---|
| JP | H04-104421 A | 4/1992 |

(Continued)

OTHER PUBLICATIONS

Extended European Search Report issued in European Patent Application No. 19894777.2, dated Jan. 7, 2022 (7 pages).

(Continued)

*Primary Examiner* — Justin N Olamit
(74) *Attorney, Agent, or Firm* — Nakanishi IP Associates, LLC

(57) ABSTRACT

A first differential pressure that is a differential pressure as a pressure difference between a high pressure side and a low pressure side in a filtration device is detected at a first time as a time while the filtration device filters a liquid. A remaining life that indicates how long the filtration member is usable from the first time is obtained based on the first differential pressure and differential pressure characteristics.

6 Claims, 16 Drawing Sheets

(56) References Cited

U.S. PATENT DOCUMENTS

2016/0208726 A1* 7/2016 Tanaka .................... F02D 41/22
2018/0113011 A1 4/2018 Inoue et al.
2018/0185775 A1 7/2018 Kuhns

FOREIGN PATENT DOCUMENTS

| | | |
|---|---|---|
| JP | H04-124440 U | 11/1992 |
| JP | 2001-518187 A | 10/2001 |
| JP | 2004-44585 A | 2/2004 |
| JP | 2009-156174 A | 7/2009 |
| JP | 2010-64031 A | 3/2010 |
| JP | 2010-227899 A | 10/2010 |
| JP | 2016-74057 A | 5/2016 |
| JP | 2017-137835 A | 8/2017 |
| JP | 2018-66665 A | 4/2018 |
| WO | 98/042425 A1 | 10/1998 |

OTHER PUBLICATIONS

International Search Report issued in PCT/JP2019/046956 dated Feb. 18, 2020 with English Translation (7 pages).
Office Action issued in Japanese Patent Application No. 2018-231947 dated Sep. 6, 2022, with English Translation (13 pages).

* cited by examiner

FILTER LIFE PREDICTING APPARATUS

CROSS-REFERENCE TO RELATED APPLICATIONS

This application is a continuation application of International Patent Application No. PCT/JP2019/046956 filed on Dec. 2, 2019, which claims priority to Japanese Patent Application No. 2018-231947 filed on Dec. 11, 2018, the entire contents of which are incorporated by reference.

TECHNICAL FIELD

The present invention relates to a filter life predicting apparatus.

BACKGROUND ART

Patent Document 1 discloses a clogging alarm switch for a filter device that senses a differential pressure between a primary side pressure and a secondary side pressure separated by a filter element, and detects clogging of the filter element.

CITATION LIST

Patent Literature

Patent Document 1: JP H01-61909 U

With the clogging alarm switch described in Patent Document 1, the differential pressure at a certain point, that is, the clogging state of the filter element can be known. However, since how long the filter element can be used (a remaining time) changes depending on a type of the filter element and usage environment of the filter element, the clogging alarm switch described in Patent Document 1 cannot obtain the remaining time.

SUMMARY OF INVENTION

One or more embodiment of the present invention provide a filter life predicting apparatus that allows prediction for how long a filtration member is usable (a remaining time).

A filter life predicting apparatus according to one or more embodiment of the present invention includes, for example, a differential pressure detection unit (detector), a storage unit (e.g., storage or memory), and a life predicting unit. The differential pressure detection unit is provided in a filtration device including a filtration member that filters a liquid. The differential pressure detection unit detects a differential pressure as a pressure difference between a high pressure side and a low pressure side in the filtration device. The storage unit stores differential pressure characteristics. The differential pressure characteristics indicate a relationship between the differential pressure and an attached dust amount as an amount of dust attached to the filtration member. The differential pressure characteristics include information on a life of the filtration member. The life predicting unit obtains a remaining life based on a first differential pressure detected by the differential pressure detection unit at a first time as a time while the filtration device filters the liquid and the differential pressure characteristics. The remaining life indicates how long the filtration member is usable after the first time.

According to the filter life predicting apparatus according to one or more embodiment of the present invention, the first differential pressure that is the differential pressure as the pressure difference between the high pressure side and the low pressure side in the filtration device is detected at the first time as the time while the filtration device filters the liquid. The remaining life that indicates how long the filtration member is usable after the first time is obtained based on the first differential pressure and the differential pressure characteristics. Accordingly, it is possible to predict how long the filtration member is usable (a remaining time).

Here, the storage unit may store a first differential pressure characteristic when a flow rate and a viscosity of the liquid are in a first condition, and a second differential pressure characteristic when the flow rate and the viscosity of the liquid are in a second condition as the differential pressure characteristics. The filter life predicting apparatus may include an acquisition (detector) unit (e.g., including one or more detectors or sensors) that acquires the flow rate and the viscosity of the liquid flowing into the filtration device. The life predicting unit may determine whether the flow rate and the viscosity acquired by the acquisition unit are close to the first condition or the second condition. The life predicting unit may obtain the remaining life using the first differential pressure characteristic when the life predicting unit determines that the first condition is close. The life predicting unit may obtain the remaining life using the second differential pressure characteristic when the life predicting unit determines that the second condition is close. As a result, even when the flow rate and the viscosity of a hydraulic oil changes due to, for example, a change in an environment, the remaining life can be accurately calculated.

Here, the differential pressure characteristics may indicate a relationship between the differential pressure and a time. The differential pressure may be obtained by measuring the differential pressure by filtering the liquid through the filtration device while dusts are continuously put into the liquid by a constant amount. The information on the life may be a life-up time. The life-up time may be an elapsed time in the differential pressure characteristics when the differential pressure is a terminal differential pressure. The terminal differential pressure may be found by adding a predetermined pressure to an initial differential pressure as the differential pressure before the dusts are put. The life predicting unit may obtain the remaining life based on a ratio between an elapsed time in the differential pressure characteristics at the first differential pressure and the life-up time. In this way, since the remaining life is obtained using the differential pressure characteristics obtained by actual measurement, the remaining life can be accurately predicted.

Here, the differential pressure detection unit may continuously detect the differential pressures. The life predicting unit may continuously obtain the remaining lives based on the continuously detected differential pressures to correct the remaining life based on the obtained results. Thus, an accurate remaining life can be obtained.

Here, the life predicting unit may obtain a first remaining life and a second remaining life as the remaining lives. The first remaining life may indicate how long the filtration member is usable after the first time. The second remaining life may indicate how long the filtration member is usable after the second time based on a second differential pressure detected by the differential pressure detection unit at a second time prior to the first time and the differential pressure characteristics. The life predicting unit may correct the differential pressure characteristics based on an elapsed time between the second remaining life and the first remaining life in the differential pressure characteristics and an elapsed time between the second time and the first time, and may correct the first remaining life based on the corrected differential pressure characteristics. As such, correcting the life-up time based on the differential pressures measured at the different times allows obtaining the appropriate remaining life according to a usage environment.

Here, the differential pressure detection unit may include a spool, a magnet, a magnetic flux density detection element, and a correction unit. The spool may be displaced according to the pressure difference. The magnet may be provided on the spool. The magnetic flux density detection element may detect a change in a magnetic flux density based on an amount of displacement of the magnet and output a first voltage according to the change in the magnetic flux density. The correction unit may correct the first voltage into a second voltage proportional to the pressure difference. The life predicting unit may obtain the remaining life based on the second voltage. This allows the differential pressure detection unit to continuously detect the differential pressures. Moreover, by proportionating the differential pressure and the second voltage, processing by the life predicting unit is facilitated.

Here, the differential pressure detection unit may include a temperature acquisition unit. The temperature acquisition unit may acquire a temperature of the magnetic flux density detection element. The correction unit may correct the first voltage based on the temperature acquired by the temperature acquisition unit. As a result, a voltage output from the correction unit becomes accurate, and thus the accurate life prediction is possible.

One or more embodiments of the present invention allows prediction for how long the filtration member is usable (a remaining time).

DESCRIPTION OF EMBODIMENTS

Hereinafter, embodiments of the present invention will be described in detail with reference to the drawings.

First Embodiment

Figure 1:
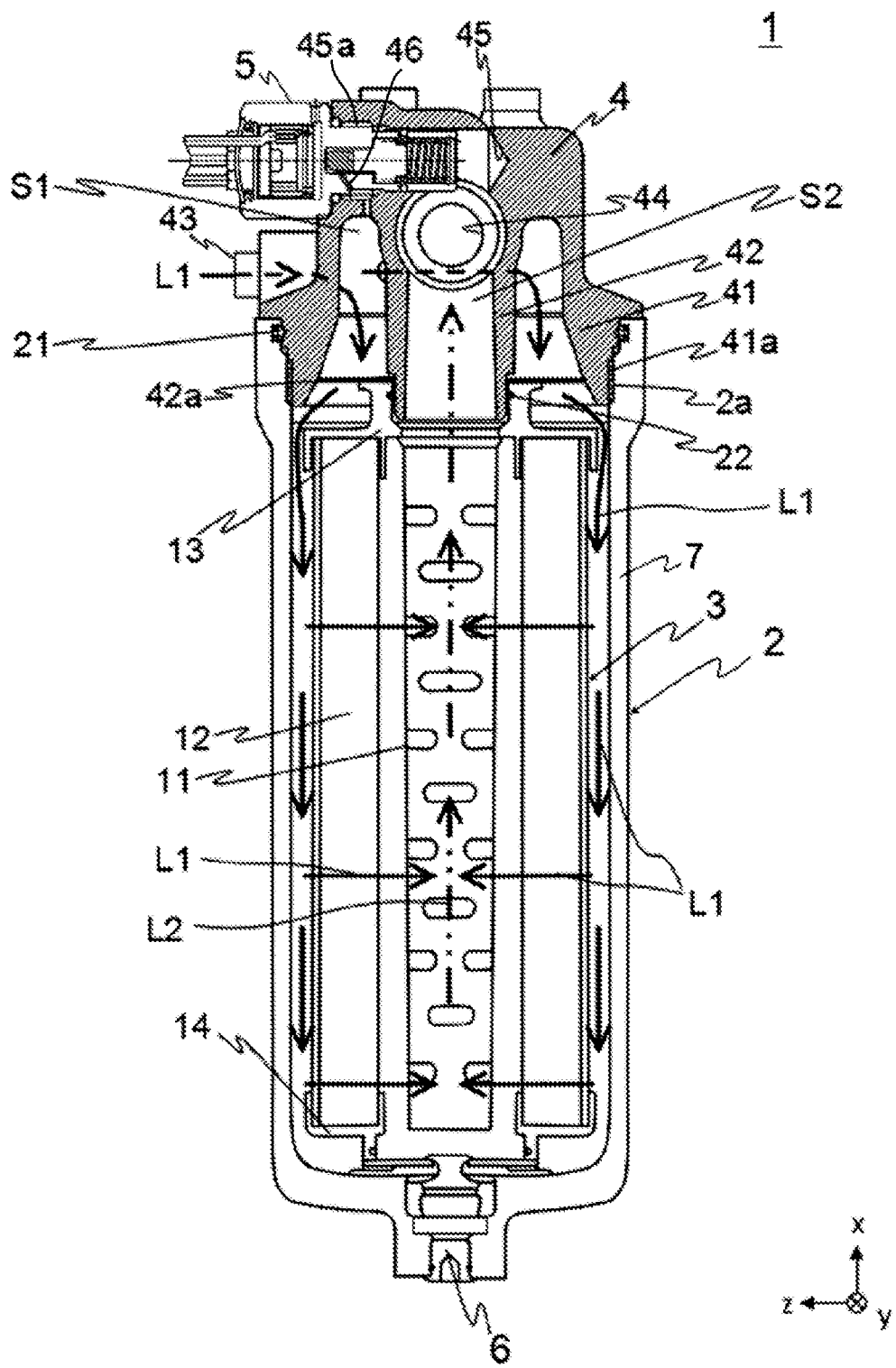
FIG. 1 is a diagram illustrating an outline of a filter life predicting apparatus 1.

FIG. 1 is a diagram illustrating an outline of a filter life predicting apparatus 1. The filter life predicting apparatus 1 of one or more embodiments of the present invention mainly includes a filtration device 2, a differential pressure detection unit 5, and a life predicting unit 8 (see FIG. 3). The differential pressure detection unit 5 is provided in the filtration device 2. Note that, FIG. 1 partially omits hatching indicative of a cross-sectional surface.

The filtration device 2 is intended for removing dust, etc., contained in a liquid, such as an oil and water, using a filter, and is incorporated, for example, in a hydraulic circuit of, for example, heavy machinery including a hydraulic actuator. Here, a hydraulic oil is used as the liquid.

The filtration device 2 mainly includes a filter element 3, a head 4, a drain 6, and a housing 7.

The housing 7 is a member having a substantially bottomed cylindrical shape having one end substantially closed and the open other end. The drain 6 is provided at the lower end of the housing 7. The drain 6 is not essential.

An opening of the housing 7 is mounted to the head 4. A differential pressure detection unit 5 is provided on the head 4. The differential pressure detection unit 5 will be described in detail later. When the opening of the housing 7 is mounted to the head 4, the filter element 3 mounted to the head 4 is housed inside the housing 7.

The filter element 3 mainly includes an inner tube 11, a filtration member 12, and plates 13 and 14 respectively provided at opposite ends of the filtration member 12.

The inner tube 11 is a member having a substantially hollow cylindrical shape having openings on both ends. The inner tube 11 is formed using a material (for example, a resin or a metal) having a high corrosion resistance.

The filtration member 12 has a substantially hollow-cylindrical shape having a thickness in a radial direction. The filtration member 12 is formed by pleating filter paper having a sheet-like shape using, for example, a synthetic resin, or paper, and connecting both ends of the filter paper pleated to roll the filter paper in a cylindrical shape. A plate 13 is provided on one end (an upper end) and a plate 14 is provided on the other end (a lower end) of the filtration member 12.

A central tube 42 (described in detail later) of the head 4 is inserted into the plate 13. A sealing member 22 (e.g., an O-ring) is disposed between the plate 13 and the central tube 42. The sealing member 22 provides sealing and prevents liquid from leaking out from between the plate 13 and the central tube 42. Furthermore, as the plate 13 is provided with the inner tube 11, when the central tube 42 is inserted into the plate 13, an internal space of the inner tube 11 communicates with the central tube 42. The inner tube 11 is inserted into the plate 14.

The head 4 mainly includes a body 41, the central tube 42, an inflow path 43, an outflow path 44, and a mounting cavity 45.

The body 41 is a substantially cylindrical bottomed member made of, for example, a material having a high corrosion resistance (for example, a metal). An external thread portion 41a is formed on the outer periphery of the body 41 in the vicinity of its open end. The external thread portion 41a is screwed with an internal thread portion 2a (see FIG. 1) formed on the inner periphery of the housing 7, whereby the head 4 is mounted to the housing 7.

A sealing member 21 (e.g., an O-ring) is disposed between the housing 7 and the head 4. The sealing member 21 provides sealing and prevents liquid from leaking out from between the housing 7 and the head 4.

The central tube 42, which is a substantially cylindrical member, is integrally formed with the body 41. The central tube 42 extends from the bottom surface of the body 41 at the center thereof along the same direction that the side surface of the body 41 protrudes. The central tube 42 is inserted into a hollow portion of the plate 13.

A space S1 defined by the side surface of the body 41 and the central tube 42 (i.e., a space outside the central tube 42) is in communication with the inflow path 43. Furthermore, a space S2 inside the central tube 42 is in communication with the outflow path 44.

Among hydraulic oils, a hydraulic oil L1 to be filtered is fed to the filtration device 2 via the inflow path 43. The hydraulic oil L1 flows in the housing 7, is then filtered by the filtration member 12, and flows out to the inside of the inner tube 11. Furthermore, a hydraulic oil L2, which was filtered and flowed out to the inside of the inner tube 11, is discharged through the outflow path 44 to the outside of the filtration device 2.

The mounting cavity 45 is formed in the vicinity of the bottom surface of the body 41. The differential pressure detection unit 5 is provided in the mounting cavity 45. An internal thread (not illustrated) is formed in the mounting cavity 45, and an external thread 51e (see FIG. 2) of the differential pressure detection unit 5 is screwed with the internal thread, and thus the differential pressure detection unit 5 is mounted to the mounting cavity 45. Sealing members 23 and 24 (e.g., O-rings, see FIG. 2) are disposed between the mounting cavity 45 and the differential pressure detection unit 5. The sealing members 23 and 24 provide sealing and prevent liquid from leaking out from between the mounting cavity 45 and the differential pressure detection unit 5.

The vicinity of a bottom portion of the mounting cavity 45 communicates with the outflow path 44, that is, the space S2. Since the bottom surface of the differential pressure detection unit 5 has an opening, the space S2 communicates with a cavity 511 (see FIG. 2, described in detail later) inside the differential pressure detection unit 5.

An internal thread portion 45a of the mounting cavity 45 is in communication with a space S1 via a hole 46. The space S1 communicates with a cavity 512 (see FIG. 2, described in detail later) inside the differential pressure detection unit 5 via a hole 51d (see FIG. 2, described in detail later) formed in the differential pressure detection unit 5.

Figure 2:
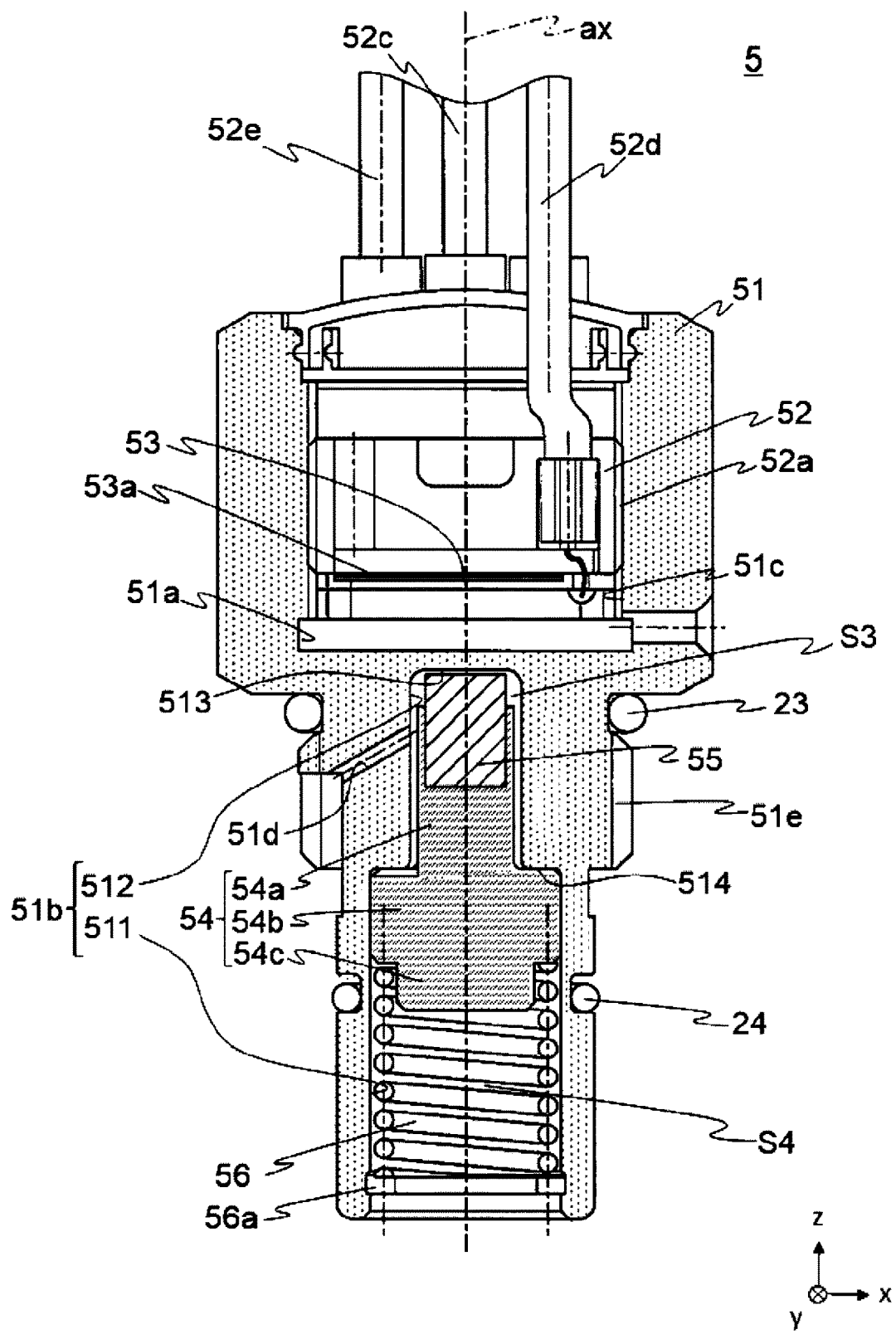
FIG. 2 is a cross-sectional view of a differential pressure detection unit 5.

Next, the differential pressure detection unit 5 will be described in detail. The differential pressure detection unit 5 is equivalent to a differential pressure detection unit according to one or more embodiments of the present invention. The differential pressure detection unit 5 continuously detects a pressure difference between a high pressure side and a low pressure side (a pressure difference between the space S1 and the space S2) in the filtration device. FIG. 2 is a cross-sectional view of the differential pressure detection unit 5. For clarity of illustration, FIG. 2 omits hatching of a plurality of components.

The differential pressure detection unit 5 mainly includes a case 51, a holder 52, a Hall element 53, a spool 54, a magnet 55, and a spring 56.

The case 51 has a substantially cylindrical shape and is provided with cavities 51a and 51b at the ends thereof, respectively. The cavities 51a and 51b each has a substantially cylindrical shape. The cavities 51a and 51b having respective bottom surfaces facing each other.

The cavity 51a is formed in the +z-side end of the case 51. An internal thread portion 51c is formed on an inner peripheral surface of the cavity 51a. The holder 52 is provided inside the cavity 51a.

The holder 52 has a substantially cylindrical shape, and an external thread portion 52a is formed therearound. The holder 52 is provided in a height-adjustable manner (a position in the z direction) inside the cavity 51a by screwing the external thread portion 52a with the internal thread portion 51c.

A substrate 53a including the Hall element 53 is provided on the bottom surface (the surface on the −z side) of the holder 52. In a state in which the holder 52 is disposed inside the cavity 51a, the center axis of the Hall element 53 substantially matches a center axis ax of the case 51.

Three cables 52c, 52d, and 52e connected to the Hall element 53 are provided in the holder 52. The cable 52c is for a power source (GND), the cable 52d is for a power source (+5 V), and the cable 52e is for a signal output (a voltage V1) of the Hall element 53.

The cavity 51b is formed in the −z-side end of the case 51. The cavity 51b mainly includes the cavity 511 and the cavity 512. The diameter of the cavity 511 is greater than the diameter of the cavity 512. Center axes of the cavities 511 and 512 match the center axis ax of the case 51.

The spool 54 is provided inside the cavity 51b. The spool 54 is a member having a substantially cylindrical shape. The spool 54 mainly includes a front end portion 54a, a flange portion 54b, and a rear end portion 54c.

The front end portion 54a is inserted into the cavity 512. The flange portion 54b has a diameter substantially the same as the diameter of the cavity 511 and is inserted into the cavity 511. When the spool 54 is provided inside the cavity 51b, the center axis of the front end portion 54a and the center axis of the flange portion 54b match the center axis ax.

The spool 54 slides the inside of the cavity 51b along the center axis ax (in the z-direction). Thus, the spool 54 divides the cavity 51b into a high-pressure side space S3, which is formed by the cavity 512 and the flange portion 54b, and a low-pressure side space S4, which is formed by the cavity 511 and the flange portion 54b.

The high-pressure side space S3 communicates with the space S1 (see FIG. 1) via the hole 51d formed in the case 51. The low pressure side space S4 communicates with the space S2 (see FIG. 1).

The spool 54 is provided with the magnet 55. When the spool 54 is disposed inside the cavity 51b, the magnet 55 is disposed on a surface opposed to a bottom surface 513 of the cavity 51b of the spool 54. In other words, the magnet 55 is provided on the side opposite to the Hall element 53 with the bottom surface 513 interposed therebetween.

The spring 56 has one end provided on the rear end portion 54c and the other end secured to the case 51 via an E-ring 56a. The spring 56 urges a force on the spool 54 in a direction from the cavity 511 toward the cavity 512 (a force in the +z direction). The spool 54 is capable of moving in the +z direction by the urging force of the spring 56 until the flange portion 54b contacts a bottom surface 514 of the cavity 511.

Next, an action of the differential pressure detection unit 5 will be described. When, for example, clogging of the filtration member 12 does not occur and a pressure difference between the space S1 (the space S3) and the space S2 (the space S4) (hereinafter referred to as a differential pressure) is less than or equal to a threshold value, the spool 54 is at a position (the position illustrated in FIG. 2) where the magnet 55 is the closest to the Hall element 53 by the urging force of the spring 56.

In contrast, when the pressure in the space S1 (the space S3) increases because of, for example, clogging of the filtration member 12, the spool 54 is moved downward (in the −z direction) against the urging force of the spring 56. In this way, the spool 54 is displaced according to the differential pressure. As the spool 54 moves downward, the magnet 55 also moves downward.

The Hall element 53 detects a change in a magnetic flux density based on the amount of displacement of the magnet 55 and outputs a voltage in response to the change in the magnetic flux density. An output signal from the Hall element 53 is a minute analog voltage. The use of the Hall element 53 allows the differential pressure detection unit 5 to continuously detect the differential pressures.

Figure 3:
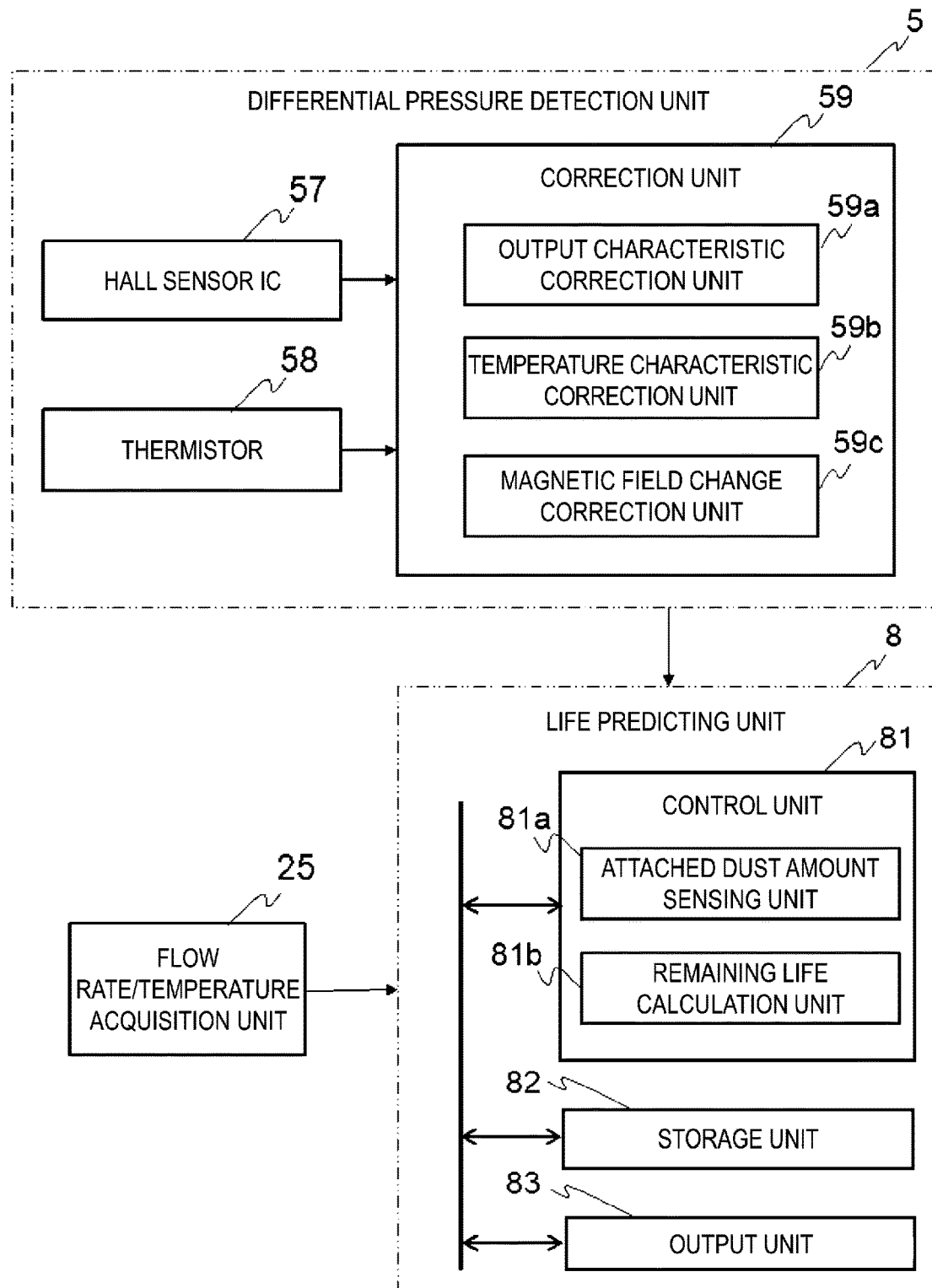
FIG. 3 is a block diagram illustrating an electrical configuration of the filter life predicting apparatus 1.

FIG. 3 is a block diagram illustrating an electrical configuration of the filter life predicting apparatus 1. In the filter life predicting apparatus 1, the differential pressure detection unit 5 and a temperature/flow rate acquisition unit 25 are each electrically connected to the life predicting unit 8.

The temperature/flow rate acquisition unit 25 acquires a flow rate and a temperature of the liquid flowing into the filtration device 2. For example, a flow rate sensor having a temperature measurement function can be used for the temperature/flow rate acquisition unit 25. The flow rate and the temperature of the liquid acquired by the temperature/flow rate acquisition unit 25 is input to the life predicting unit 8.

The differential pressure detection unit 5 mainly includes a Hall sensor IC 57, a thermistor 58, and a correction unit 59. The Hall sensor IC 57 and the thermistor 58 are each connected to the correction unit 59. The Hall sensor IC 57, the thermistor 58, and the correction unit 59 are provided on the substrate 53a (see FIG. 2).

The Hall sensor IC 57 is formed by incorporating the Hall element 53 and a signal conversion circuit into a package, and is provided on the substrate 53a. The Hall sensor IC 57 adjusts and amplifies the minute analog voltage output by the Hall element 53. The output from the Hall sensor IC 57 (referred to as a voltage V2) is input to the correction unit 59.

The thermistor 58 acquires the temperature of the Hall sensor IC 57, and is provided in the vicinity of the Hall sensor IC 57. The temperature acquired by the thermistor 58 is input to the correction unit 59.

The correction unit 59 corrects the voltage V2 input from the Hall sensor IC 57 into the voltage V1 proportional to the differential pressure. The correction unit 59 may be an analog circuit, or may be a processor that reads and executes a program stored in a storage unit. The correction unit 59 mainly includes an output characteristic correction unit 59a, a temperature characteristic correction unit 59b, and a magnetic field change correction unit 59c.

The output characteristic correction unit 59a is a basic function unit of the correction unit 59. Even though the change in a magnetic field is constant, the output from the Hall element 53 (the voltage V2) changes curvilinearly. The output characteristic correction unit 59a corrects this curvilinear change into a straight line. To achieve the correction unit 59 by an analog circuit, a non-linear amplifier is used for the output characteristic correction unit 59a.

Figure 4:
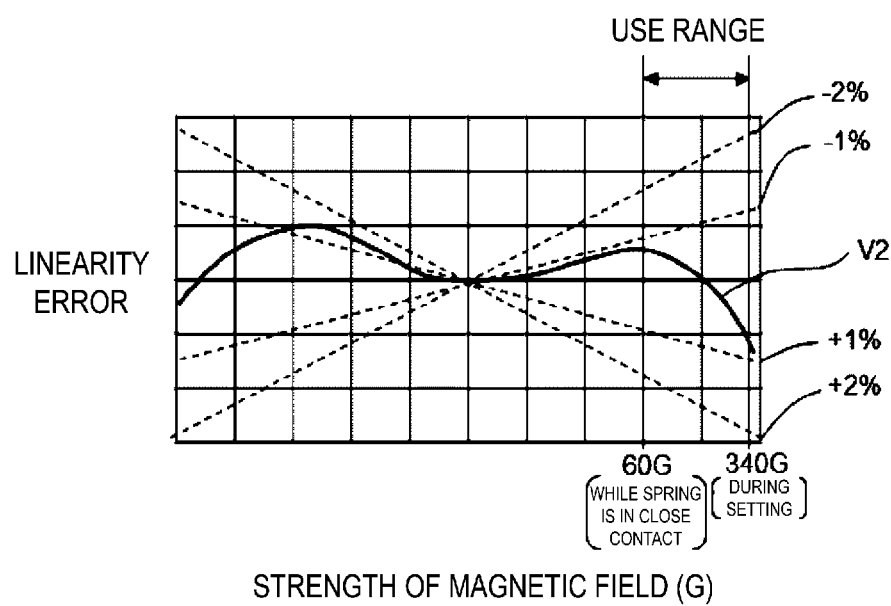
FIG. 4 is a graph illustrating a relationship between a strength of a magnetic field and a linearity error.

FIG. 4 is a graph illustrating a relationship between a strength of a magnetic field and a linearity error. The use range of this embodiment is from 60 G (gauss) to 340 G. The differential pressure is proportional to the position of the magnet 55, that is, the strength of the magnetic field. When the differential pressure is small, since the magnet 55 is close to the Hall element 53, the magnetic field is strong (340 G). When the differential pressure is large, since the magnet 55 is far from the Hall element 53, the magnetic field is weak (60 G).

As illustrated in FIG. 4, the strength of the magnetic field is not proportional to the voltage V2 (see the bold line in FIG. 4), and the voltage V2 becomes a curved line. However, in the usage range, the linearity error is within the range of ±1%.

Figure 5:
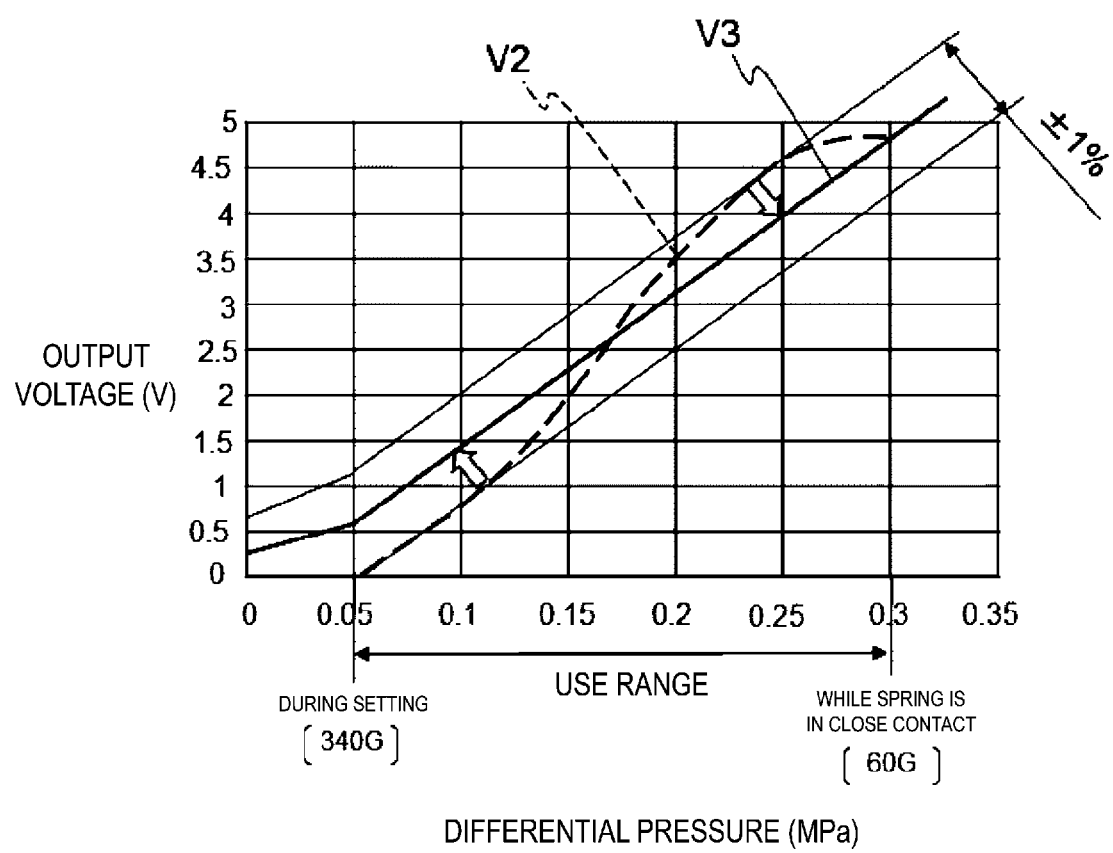
FIG. 5 is a diagram illustrating a relationship between a differential pressure and voltages V2 and V3.

FIG. 5 is a diagram illustrating a relationship between the differential pressure and the voltage V2 and a voltage V3 (the voltage after correction). In FIG. 5, the thick dashed line indicates the voltage V2 and the solid line indicates the voltage V3. Similar to FIG. 4, the voltage V2 becomes the curved line in FIG. 5 as well. The output characteristic correction unit 59a corrects the curved voltage V2 to be the voltage V3, which is proportional to the differential pressure (see the open arrows in FIG. 5).

The temperature characteristic correction unit 59b corrects the voltage V2 based on the temperature acquired by the thermistor 58. To achieve the correction unit 59 by an analog circuit, a non-linear amplifier is used for the temperature characteristic correction unit 59b.

Figure 6:
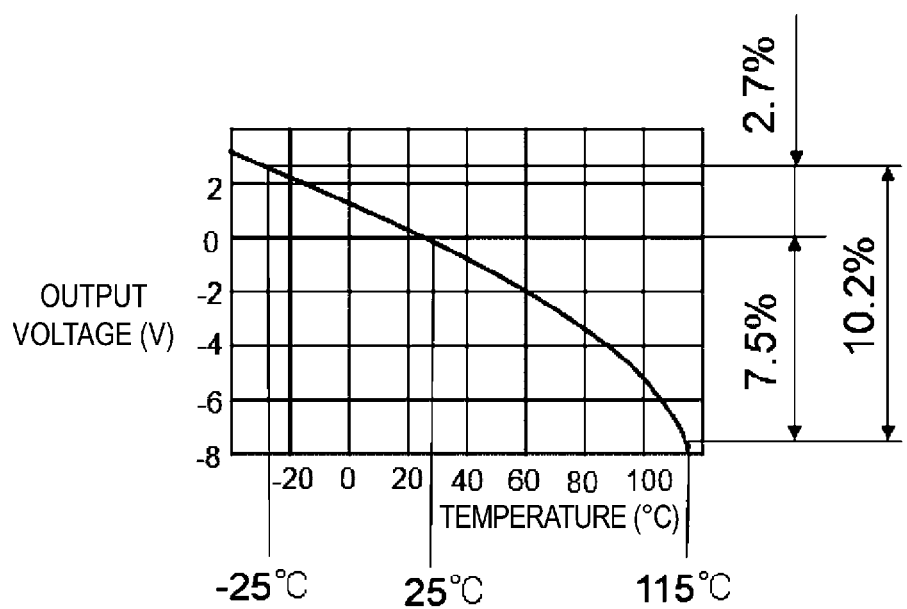
FIG. 6 is a graph illustrating a relationship between a temperature and the voltage V2 with a distance between a magnet 55 and a Hall element 53 held constant.

FIG. 6 is a graph illustrating a relationship between the temperature and the voltage V2 with a distance between the magnet 55 and the Hall element 53 held constant. The output (the voltage V2) from the Hall sensor IC 57 changes by the temperature. With 25° C. as the criterion, there is 2.7% error at −25° C. and 7.5% error at 115° C. When the use range is set from −25° C. to 115° C., the error ranges 10.2%.

Figure 7:
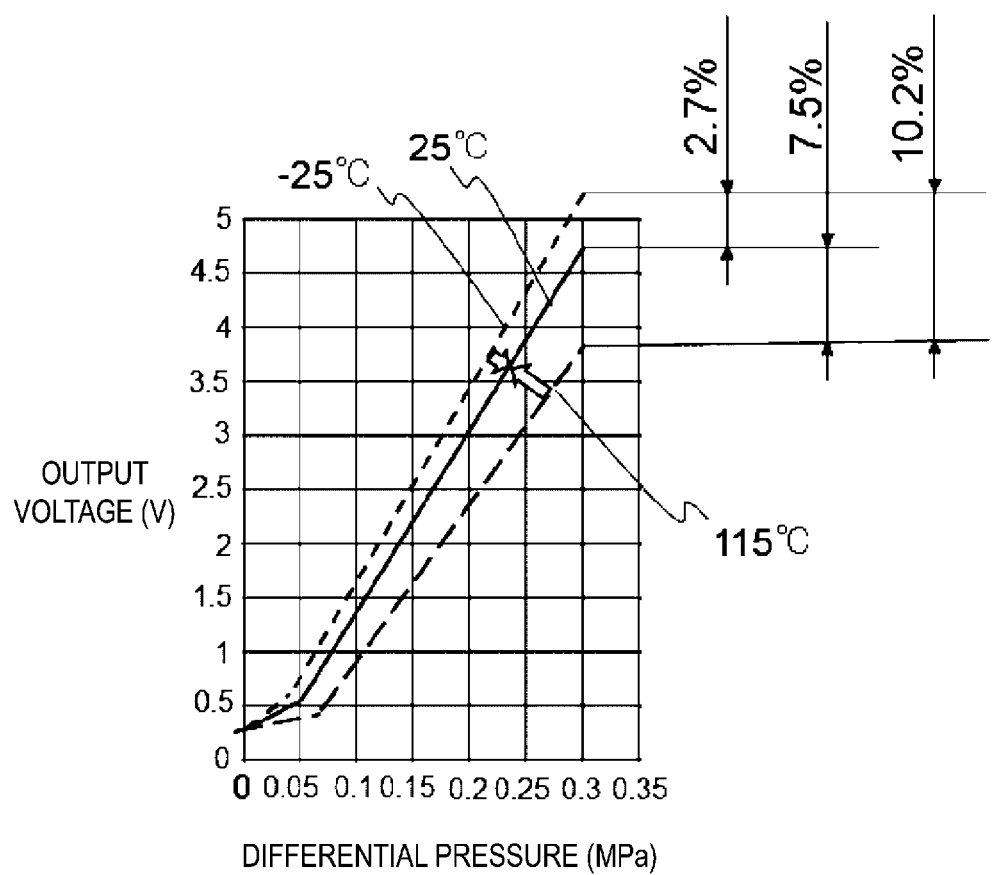
FIG. 7 is a diagram illustrating a relationship between the differential pressure and a voltage.

FIG. 7 is a diagram illustrating a relationship between the differential pressure and the voltage. FIG. 7 is a graph after linear correction by the output characteristic correction unit 59a. In FIG. 7, the solid line indicates the voltage at 25° C., the thick dashed line indicates the voltage at 115° C., and the thick dotted line indicates the voltage at −25° C. The temperature characteristic correction unit 59b corrects the voltage V3 linearly corrected by the output characteristic correction unit 59a so as to be the voltage at 25° C. as the criterion (see the open arrows in FIG. 7). As a result, the voltage output from the correction unit 59 becomes accurate, and thus the accurate life prediction is possible.

Note that in the present embodiment, the temperature characteristic correction unit 59b corrects the voltage V2 by correcting the voltage V3 linearly corrected by the output characteristic correction unit 59a, but may directly correct the voltage V2.

Figure 8:
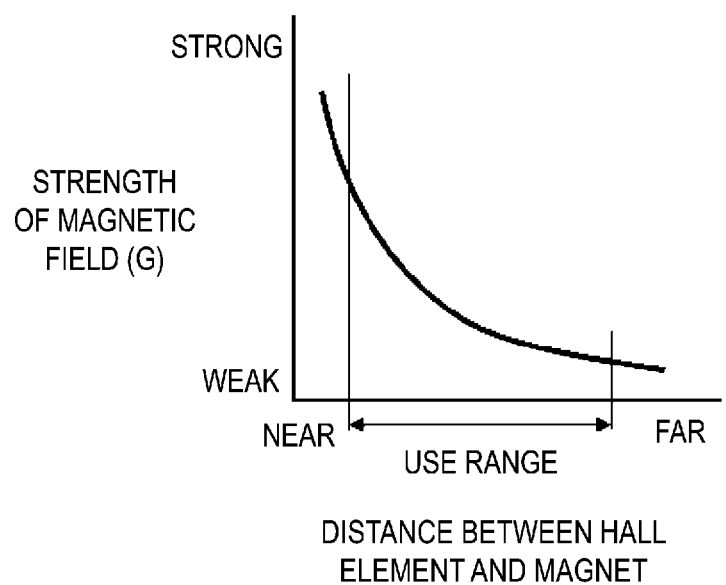
FIG. 8 is a graph illustrating a relationship between the distance between the magnet 55 and the Hall element 53 and the strength of the magnetic field.
Figure 9:
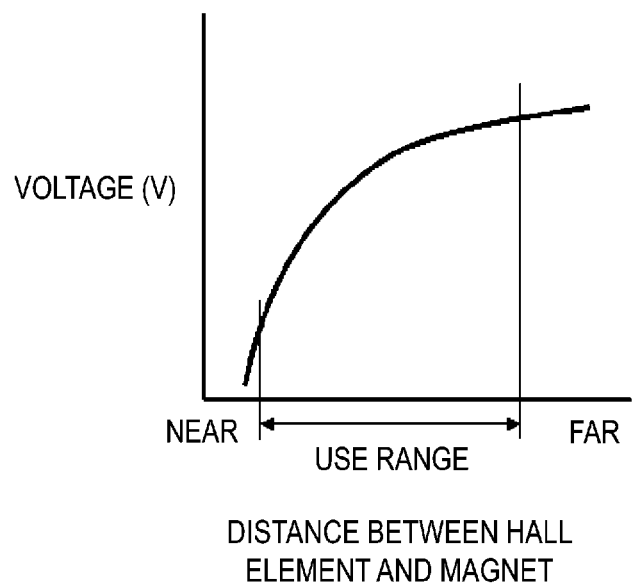
FIG. 9 is a graph illustrating the relationship between the distance between the magnet 55 and the Hall element 53 and the voltage V2.

The magnetic field change correction unit 59c corrects the voltage V2 so that the distance between the magnet 55 and the Hall element 53 (namely, the differential pressure) is proportional to the strength of the magnetic field. To achieve the correction unit 59 by an analog circuit, a non-linear amplifier is used for the magnetic field change correction unit 59c. FIG. 8 is a graph illustrating a relationship between the distance between the magnet 55 and the Hall element 53 and the strength of the magnetic field. Since the magnetic flux density spreads radially, the magnetic field of the magnet 55 is inversely proportional to the square of the distance between the magnet 55 and the Hall element 53. FIG. 9 is a graph illustrating the relationship between the distance between the magnet 55 and the Hall element 53 and the output (the voltage V2) from the Hall sensor IC 57. The graph illustrated in FIG. 8 and the graph illustrated in FIG. 9 are in a relationship of inverse proportion.

Figure 10:
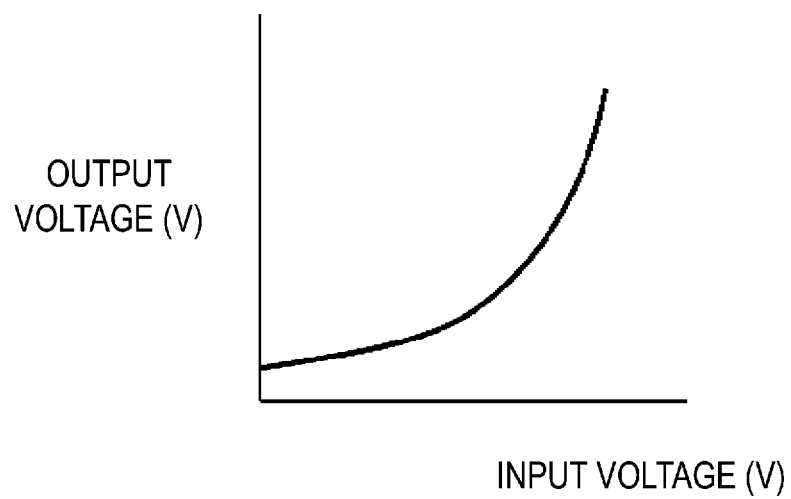
FIG. 10 is a graph illustrating characteristics of a non-linear amplifier used in a magnetic field change correction unit 59c.
Figure 11:
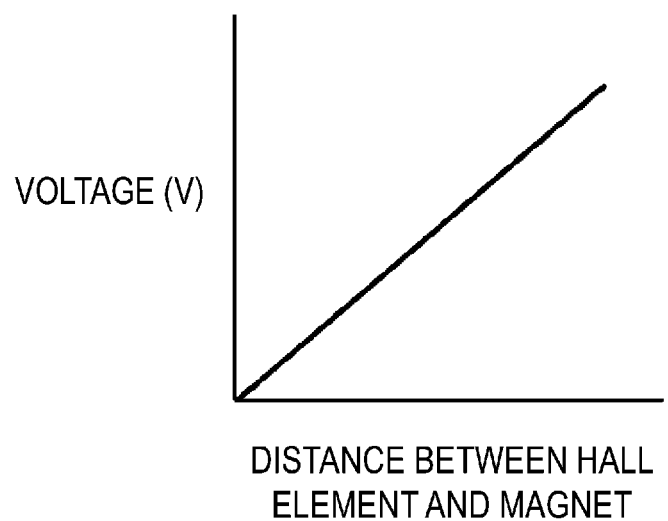
FIG. 11 is a graph illustrating a relationship between the distance between the magnet 55 and the Hall element 53 and an output voltage from the magnetic field change correction unit 59c.

FIG. 10 is a graph illustrating characteristics of the non-linear amplifier used in the magnetic field change correction unit 59c. The horizontal axis in FIG. 10 is the input voltage (the voltage V2), and the vertical axis in FIG. 10 is the output voltage from the magnetic field change correction unit 59c. Defining the input as x and defining the output as y, the non-linear amplifier performs the output according to the function $y=ax^c+b$, and c=2 in the present embodiment. FIG. 11 is a graph illustrating a relationship between the distance between the magnet 55 and the Hall element 53 and an output voltage from the magnetic field change correction unit 59c. The magnetic field change correction unit 59c multiplies the voltage illustrated in FIG. 9 by amplifier characteristics illustrated in FIG. 10 to correct the voltage V2 so that the differential pressure is proportional to the strength of the magnetic field.

The correction unit 59 performs correction on the voltage V2 by the output characteristic correction unit 59a, correction by the temperature characteristic correction unit 59b, and correction by the magnetic field change correction unit 59c to correct the voltage V2 to the voltage V1 proportional to the differential pressure. This facilitates processing by the life predicting unit 8. The correction unit 59 outputs the voltage V1 to the life predicting unit 8.

However, the magnetic field change correction unit 59c is not essential, and the correction of the voltage V2 by the magnetic field change correction unit 59c is not essential as well. Since the correction of the voltage V2 by the magnetic field change correction unit 59c is supplementary, even when the magnetic field change correction unit 59c does not correct the voltage V2, the voltage V1 corrected by the correction unit 59 is proportional to the differential pressure.

The life predicting unit 8 is configured by, for example, a computer, and includes a CPU and a memory. The life predicting unit 8 mainly includes a control unit 81, a storage unit 82, and an output unit 83. The storage unit 82 is a memory, and is constituted by a Random Access Memory (RAM), which is a volatile storage device, or a Read Only Memory (ROM), which is a non-volatile storage device. The output unit 83 includes an output device, such as a display, and an interface (I/F) connecting the control unit 81 and other devices.

Figure 12:
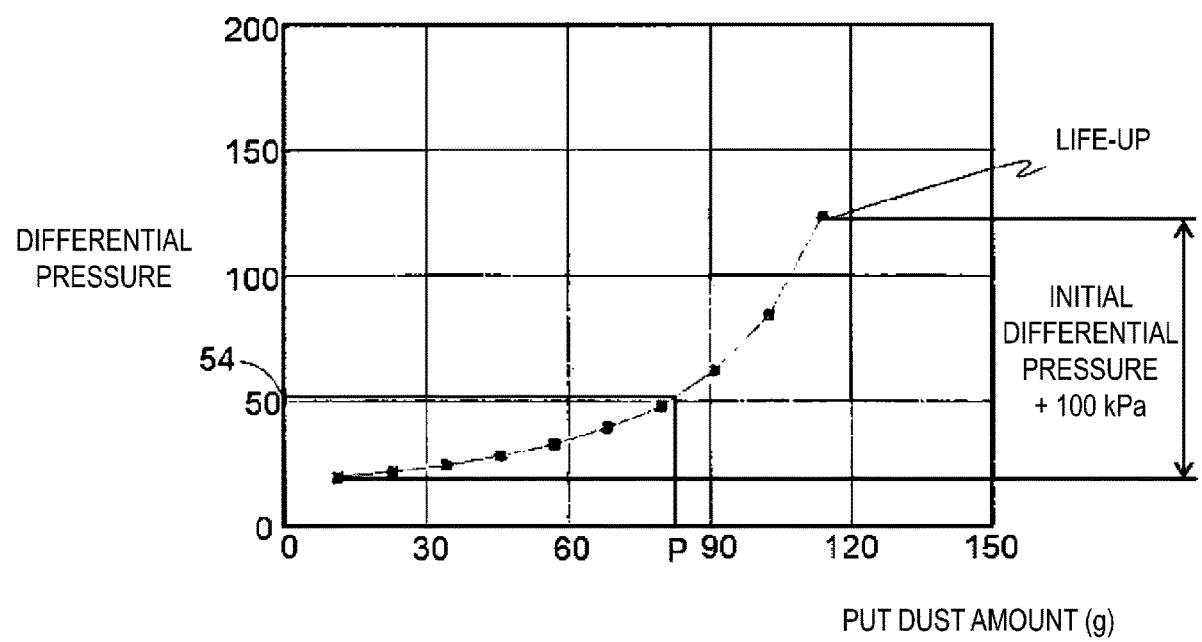
FIG. 12 is a diagram illustrating an example of differential pressure characteristics.

The storage unit 82 stores differential pressure characteristics indicating a relationship between the differential pressure and an attached dust amount, which is an amount of dust attached to the filtration member. FIG. 12 is a diagram illustrating an example of the differential pressure characteristics. The differential pressure characteristics of FIG. 12 are obtained by filtering the liquid through the filtration device while continuously putting a constant amount of dusts into the liquid and measuring the differential pressure. The differential pressure is measured by the method specified in JIS B8356-8 (ISO 16889) Hydraulic filter performance evaluation method. Note that the differential pressure characteristics of FIG. 12 are differential pressure characteristics of the filter element 3 used in the present embodiment. In a case where the type of the filter element used is different, the differential pressure characteristics also differ. Thus, the storage unit 82 preliminarily stores the differential pressure characteristics according to the type of the filtration device 2.

The vertical axis in FIG. 12 indicates the differential pressure. The horizontal axis in FIG. 12 indicates the dust amount put into the liquid. Since the dust amount put into the liquid and the attached dust amount are proportional, the horizontal axis in FIG. 12 is equivalent to the attached dust amount. In other words, the differential pressure characteristics are a graph illustrating the relationship between the differential pressure and time. Since the dust amount put into the liquid is proportional to the time, the horizontal axis in FIG. 12 is equivalent to the time.

When the attached dust amount is small, the differential pressure increases little by little in association with the increase in attached dust amount. Meanwhile, when the attached dust amount is increased, the differential pressure increases greatly in association with the increase in attached dust amount. In the present embodiment, a time point at which the differential pressure becomes a terminal differential pressure, which is found by adding a predetermined pressure (here, 100 kPa) to the differential pressure before the dust is put (an initial differential pressure) is determined as life-up (the life comes at the end=the remaining life is 0%). An elapsed time to the life-up in the differential pressure characteristics (a life-up time) is included in the differential pressure characteristics and is stored in the storage unit 82. Note that the predetermined pressure is not limited to 100 kPa.

The differential pressure characteristics are changed by flow rate or viscosity (namely, a fluid temperature), so the differential pressure characteristics need to be obtained under a condition that the flow rate and the temperature of the hydraulic oil are constant. Therefore, a plurality of the conditions for the flow rate and the viscosity of the hydraulic oil are determined, and the differential pressure measured under these conditions is preliminarily stored in the storage unit 82. FIG. 12 is differential pressure characteristics when the flow rate is 400 L (liter)/minute and the viscosity is 22 mm$^2$/second (the temperature is 60 degrees).

In the present embodiment, in addition to the differential pressure characteristics (denoted as differential pressure characteristics A) illustrated in FIG. 12, the storage unit 82 stores differential pressure characteristics B with conditions for the flow rate and the viscosity (denoted as a condition B) different from the conditions for the flow rate and the viscosity (denoted as a condition A) during the measurement of the differential pressure characteristics A, and differential pressure characteristics C with a condition C for the flow rate and the viscosity different from the conditions A and B. Furthermore, the storage unit 82 stores the conditions A, B, and C associated with the differential pressure characteristics A, B, and C. However, the number of differential pressure characteristics stored in the storage unit 82 is not limited to three.

Figure 13:
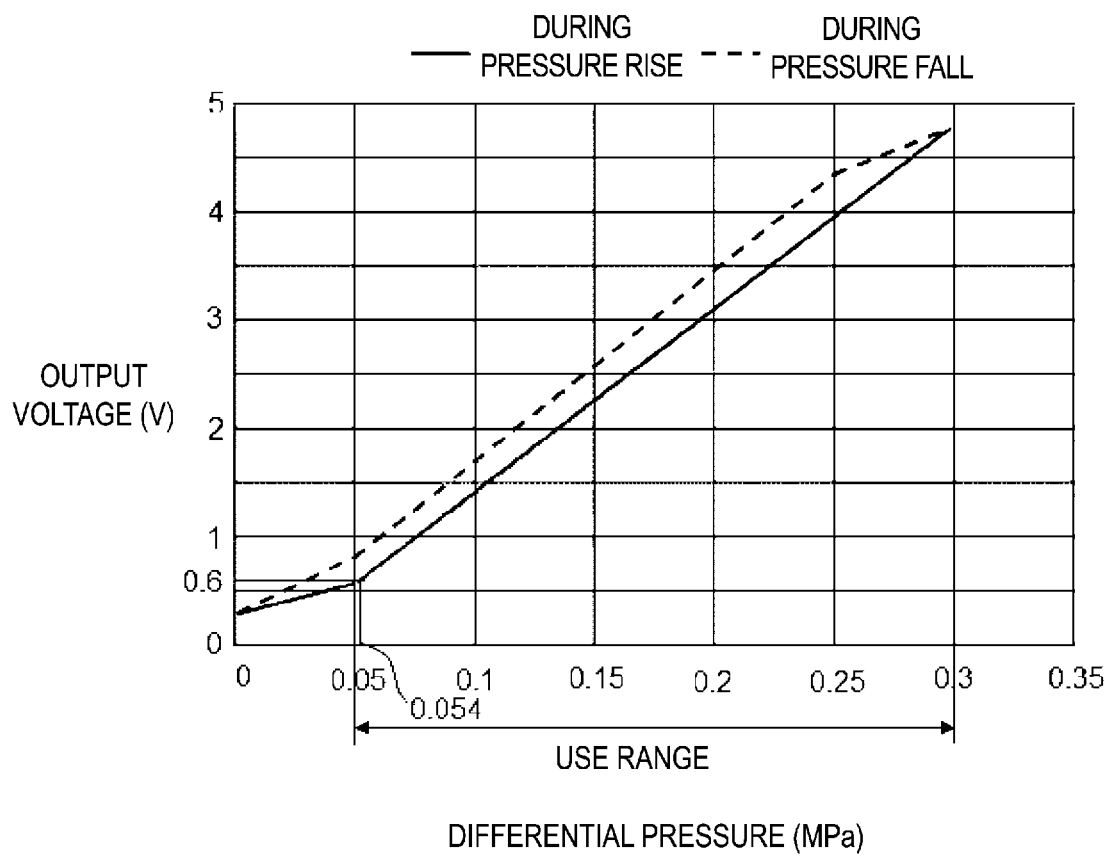
FIG. 13 is a graph illustrating a relationship between a voltage V1 and the differential pressure.

The storage unit 82 stores information indicative of the relationship between the voltage V1 and the differential pressure. FIG. 13 is a graph illustrating a relationship between the voltage V1 and the differential pressure. Since the voltage V1 is proportional to the differential pressure, the differential pressure is unambiguously determined with respect to the voltage V1. Due to hysteresis of the Hall element 53 and the use of the spring 56, there is a difference in output (having override characteristics) between the time of pressure rise and the time of pressure fall. The present embodiment uses the value at the time of pressure rise (see the solid line in FIG. 13).

The control unit 81 is achieved by reading out a predetermined program stored in the ROM into the RAM and executing the program by a Central Processing Unit (CPU). The control unit 81 mainly includes an attached dust amount sensing unit 81a and a remaining life calculation unit 81b.

The attached dust amount sensing unit 81a senses the attached dust amount attached to the filtration member 12 based on the voltage V1 output from the correction unit 59, that is, the differential pressure, and the differential pressure characteristics stored in the storage unit 82. The attached dust amount sensing unit 81a determines which condition A, B, or C is the closest to the flow rate and the temperature (that is, the viscosity) acquired by the temperature/flow rate acquisition unit 25, and senses the attached dust amount using the differential pressure characteristics associated with the closest condition. Note that, since the temperature is proportional to the viscosity, determining the temperature unambiguously determines the viscosity.

For example, assume that when the flow rate and the viscosity acquired by the temperature/flow rate acquisition unit 25 are the closest to the condition A, the Hall element 53 performs detection at any given time during which the filtration device 2 filtrates a hydraulic oil and the voltage V1 output from the correction unit 59 is 0.6 V. First, the attached dust amount sensing unit 81a refers to information indicating the relationship between the voltage V1 and the differential pressure illustrated in FIG. 13, and acquires that the differential pressure at the voltage V1 of 0.6 V is 0.054 MPa (54 kPa). Next, the attached dust amount sensing unit 81a refers to the differential pressure characteristics A illustrated in FIG. 12, and acquires a value P on the horizontal axis when the differential pressure is 0.054 MPa (54 kPa).

The remaining life calculation unit 81b obtains a remaining life indicating how long the filtration member can be used (a remaining time) based on the attached dust amount and the differential pressure characteristics. The remaining life calculation unit 81b obtains the remaining life using the differential pressure characteristics selected by the attached dust amount sensing unit 81a. Hereinafter, the description will be given with an example in which the attached dust amount sensing unit 81a acquires the value on the horizontal axis of the differential pressure characteristics A.

Figure 14:
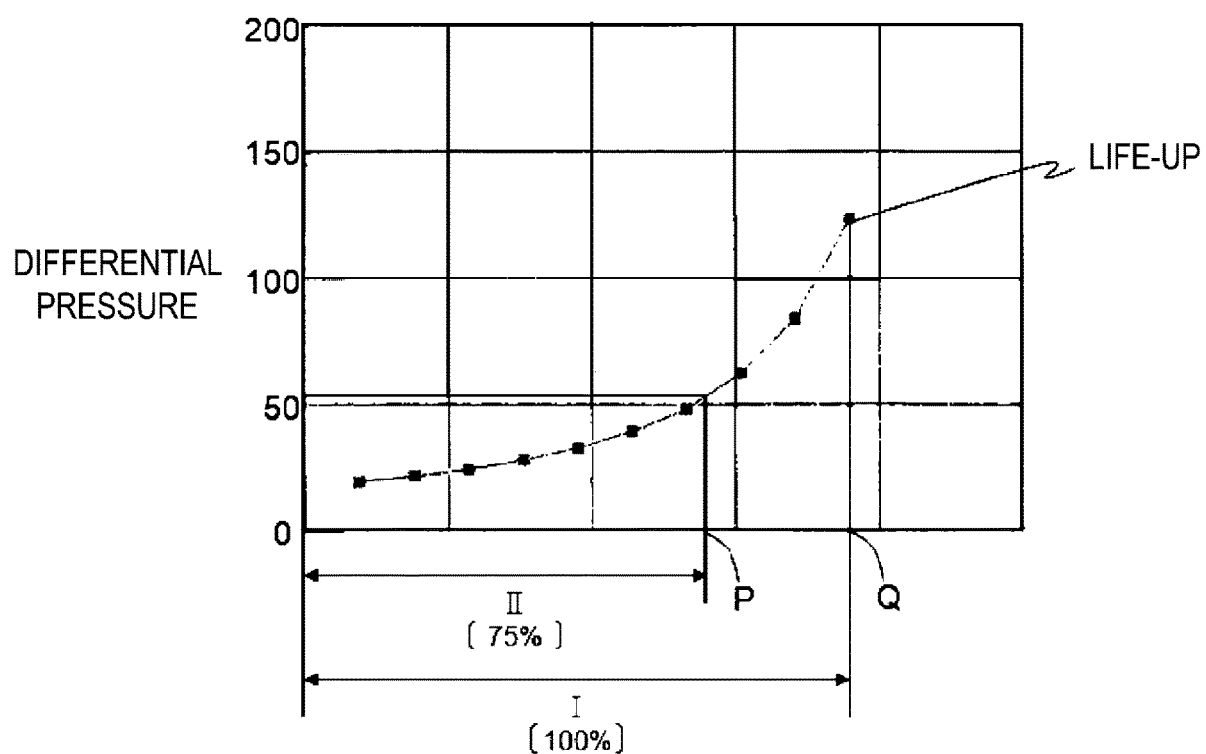
FIG. 14 is a diagram describing a method for obtaining a remaining life by a remaining life calculation unit 81b.

FIG. 14 is a diagram describing a method for obtaining the remaining life by the remaining life calculation unit 81b. The graph in FIG. 14 is the same as the differential pressure characteristics A. Additionally, in FIG. 14, a value on the horizontal axis at the time of life-up (a life-up time) is denoted as Q. The remaining life calculation unit 81b obtains a distance II between the value of 0 on the horizontal axis and the value P on the horizontal axis in the graph in FIG. 14. Additionally, in the graph of FIG. 14, the remaining life calculation unit 81b obtains a distance I between the value of 0 on the horizontal axis and the value Q on the horizontal axis. As already explained, the horizontal axis of the differential pressure characteristics A is equivalent to the time, so the distances I and II are equivalent to the elapsed time in the differential pressure characteristics.

Next, the remaining life calculation unit 81b obtains a percentage of the distance II when the distance I is defined as 100%. Here, the distance II is approximately 75% of the distance I. Therefore, the remaining life calculation unit 81b obtains that the remaining life of the filtration member 12 is approximately 25%. Additionally, the remaining life calculation unit 81b obtains the time of the remaining life based on the percentage of the remaining life. For example, in a case where the life-up time is approximately 1000 hours, the remaining life calculation unit 81b obtains the remaining life time (the remaining usable time) as approximately 250 hours (approximately 1000 hours×0.25).

In other words, the attached dust amount sensing unit 81a obtains the time corresponding to the differential pressure in the differential pressure characteristics, and the remaining life calculation unit 81b obtains the remaining life based on a ratio between the time obtained by the attached dust amount sensing unit 81a and the life-up time.

According to the present embodiment, the remaining time is obtained using the differential pressure as the pressure difference between the high pressure side and the low pressure side in the filtration device 2, and therefore how long the filtration member can be used (the remaining time) can be predicted. For example, with the use of a differential pressure detection device using a reed switch, the reed switch only turns on and off at a predetermined differential pressure, and thus a user can know only that the differential pressure has reached the predetermined pressure. In contrast, in the present embodiment, since the voltage proportional to the differential pressure is continuously obtained using the Hall element 53, the user can obtain the differential pressure other than the predetermined differential pressure, thereby ensuring predicting the remaining life accurately.

In addition, in the present embodiment, since the differential pressure detection unit 5 continuously detects the differential pressure, the remaining life can be continuously calculated. Thus, the user can know the remaining life at any timing, and this facilitates inventory management of the filter element 3.

In addition, according to the present embodiment, since the remaining life is obtained using the differential pressure characteristics obtained by actual measurement, the remaining life can be accurately predicted. In addition, the differential pressure characteristics under a plurality conditions in which the flow rate and the viscosity of the hydraulic oil differ are preliminarily stored, and the remaining life is obtained using the differential pressure characteristics under the conditions closest to the flow rate and the temperature of the fluid filtered by the filtration device 2. Accordingly, even when the flow rate or the viscosity of the hydraulic oil changes due to, for example, a change in a usage environment, the remaining life can be accurately calculated.

Second Embodiment

The time to the life-up of the filtration member 12 possibly changes depending on the environment in which the filtration device 2 is used. For example, the use of the filtration device 2 under a dust-rich environment increases the attached dust amount to the filtration member 12 per unit time, shortening the life of the filtration member 12. In addition, the use of the filtration device 2 under in an environment with a small dust amount reduces the attached dust amount to the filtration member 12 per unit time, lengthening the life of the filtration member 12. The second embodiment of the present invention has a configuration that corrects the remaining life according to the usage environment. Hereinafter, a filter life predicting apparatus 1A according to the second embodiment will be described below. Note that the same components as those in the first embodiment are denoted by the same reference signs, and description of the components is omitted.

Figure 15:
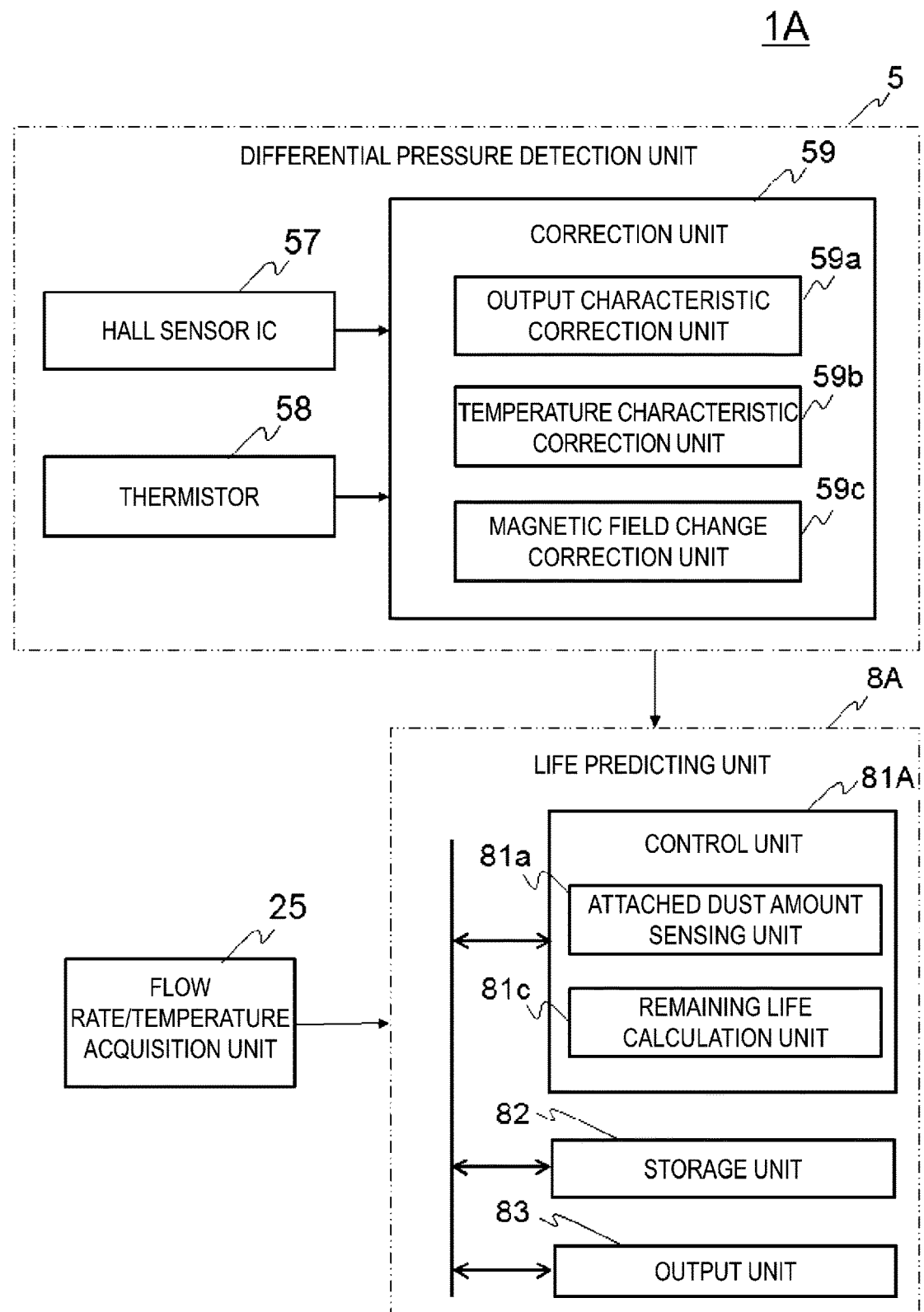
FIG. 15 is a block diagram illustrating an electrical configuration of a filter life predicting apparatus 1A.

FIG. 15 is a block diagram illustrating an electrical configuration of the filter life predicting apparatus 1A. In the filter life predicting apparatus 1A, the differential pressure detection unit 5 and the temperature/flow rate acquisition unit 25 are each electrically connected to a life predicting unit 8A.

The life predicting unit 8A is configured by, for example, a computer, and includes a CPU and a memory. The life predicting unit 8A mainly includes a control unit 81A, the storage unit 82, and the output unit 83. The control unit 81A is achieved by reading a predetermined program stored in the ROM into the RAM and executing the program by the Central Processing Unit (CPU) and mainly includes the attached dust amount sensing unit 81a and a remaining life calculation unit 81c.

The remaining life calculation unit 81c obtains a remaining life indicating how long the filtration member can be used (the remaining time) based on the attached dust amount and the differential pressure characteristics. The remaining life calculation unit 81c differs from the remaining life calculation unit 81b in that the remaining life is corrected based on the continuously detected differential pressures. Hereinafter, a point that the remaining life calculation unit 81c corrects the remaining life based on the continuously detected differential pressures will be described.

Figure 16:
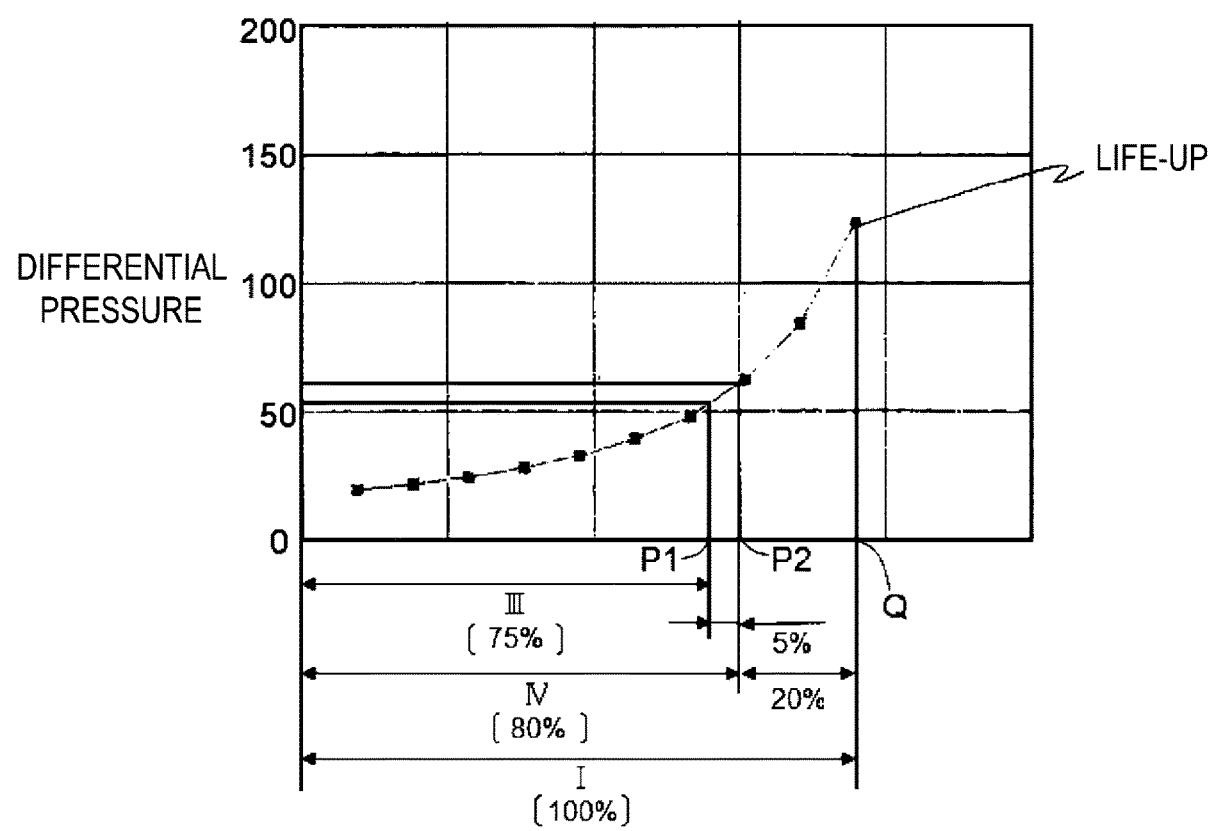
FIG. 16 is a diagram describing a method in which a remaining life calculation unit 81c obtains and corrects the remaining life.

FIG. 16 is a diagram describing a method in which the remaining life calculation unit 81c obtains and corrects the remaining life. For example, assume that the attached dust amount sensing unit 81a acquires two (P1 and P2) values on the horizontal axis of the differential pressure characteristics A at different times (denoted as times T1 and T2). Note that the times T1 and T2 are any given times while the filtration device 2 filters the hydraulic oil, and the time T1 is prior to the time T2. The remaining life calculation unit 81c obtains a distance III between the value of 0 on the horizontal axis and the value P1 on the horizontal axis and a distance IV between the value of 0 on the horizontal axis and the value P2 on the horizontal axis in the differential pressure characteristics A. Additionally, in the graph of FIG. 14, the remaining life calculation unit 81c obtains the distance I between the value of 0 on the horizontal axis and the value Q on the horizontal axis. Then, the remaining life calculation unit 81c obtains percentages of the distances III and IV when the distance I is defined as 100%. Here, the distance II is approximately 75% of the distance I, and the distance IV is approximately 80% of the distance I. In addition, the remaining life calculation unit 81c obtains the remaining life of the filtration member 12 at the time T1 as approximately 25%, and the remaining life of the filtration member 12 at the time T2 as approximately 20%.

Note that the remaining life calculation unit 81c continuously obtains the remaining lives, obtains the remaining life of the filtration member 12 at the time T1 at the time point of the elapse of the time T1, and obtains the remaining life of the filtration member 12 at the time T2 at the time point of the elapse of the time T2.

Next, the remaining life calculation unit 81c obtains the elapsed time between the remaining life of the filtration member 12 at the time T1 and the remaining life of the filtration member 12 at the time T2 in the differential pressure characteristics (the elapsed time between the time T1 and the time T2 in the differential pressure characteristics). Here, the difference between the distance III and the distance IV when the distance I is defined as 100% is 5%, and therefore, in a case where the life-up time is approximately 1000 hours, the remaining life calculation unit 81c calculates that between the time T1 and the time T2 is approximately 50 hours.

The remaining life calculation unit 81c corrects the horizontal axis of the differential pressure characteristics, namely, the life-up time, based on the result of comparison between the elapsed time between the time T1 and the time T2 in the differential pressure characteristics and the elapsed time between the actual time T1 and the actual time T2. For example, in a case time between the actual time T1 and the actual time T2 are approximately 25 hours and the time obtained from the difference between the distance III and the distance IV is approximately 50 hours, the remaining life calculation unit 81c halves the horizontal axis and the life-up time of the differential pressure characteristics. For example, in a case where the life-up time is approximately 1000 hours, the remaining life calculation unit 81c calculates the life-up time as approximately 500 hours (approximately 1000 hours×½).

Then, the remaining life calculation unit 81c corrects the remaining life time (the remaining usable time) from the time T2 based on the corrected differential pressure characteristics (the life-up time). For example, in a case where the life-up time is corrected into approximately 500 hours, the remaining life calculation unit 81c obtains the remaining life time from the time T2 as approximately 100 hours (approximately 500 hours×0.2).

According to the present embodiment, regardless of the environment in which the filtration device 2 is used, the accurate remaining life can be obtained. For example, the filtration device 2 used in the dust-rich environment increases the attached dust amount per unit time, thereby shortening the life-up time. As such, since the remaining life changes depending on the usage environment of the filtration device 2, correcting the life-up time based on the differential pressures measured at different times allows obtaining the appropriate remaining life according to the usage environment. In addition, after the usage environment of the filtration device 2 changes, the remaining life is obtained at two different times, and the remaining life is corrected based on the result and the differential pressure characteristics, thus ensuring correcting the remaining life according to the change in the usage environment.

The embodiments of the invention are described above in detail with reference to the drawings. However, specific configurations are not limited to the embodiments and also include changes in design or the like without departing from the gist of the invention. A person skilled in the art can appropriately change, add, and convert each element in the embodiments.

Additionally, in the present disclosure, "substantially" is a concept not only including the case of being strictly the same, but also including an error and deformation to the extent that a loss of identity does not occur. For example, "substantially parallel" is not limited to the case of being strictly parallel, and is, for example, a concept including some errors. Additionally, for example, the case of expressing "parallel," "orthogonal," "matching," and the like includes not only the case of being strictly parallel, orthogonal, matching, and the like, but also the case of being substantially parallel, substantially orthogonal, substantially matching, and the like. Additionally, in the present disclosure, "vicinity" means to include a region in a certain range (the range can be determined arbitrarily) near a reference position. For example, the case of expressing "in the vicinity of A" is a concept that a region in a certain range near A may include A or may not include A.

REFERENCE SIGNS LIST 1, 1A Filter life predicting apparatus
2 Filtration device

2a Internal thread portion
3 Filter element
4 Head
5 Differential pressure detection unit (detector)
6 Drain
7 Housing
8, 8A Life predicting unit
11 Inner tube
12 Filtration member
13, 14 Plate
21, 22, 23, 24 Sealing member
25 Temperature/flow rate acquisition unit
41 Body
41a External thread portion
42 Central tube
43 Inflow path
44 Outflow path
45 Mounting cavity
46 Hole
51 Case
51a, 51b Cavity
51c Internal thread portion
51d Hole
51e External thread portion
52 Holder
52a External thread portion
52c, 52d, 52e Cable
53 Hall element
53a Substrate
54 Spool
54a Front end portion
54b Flange portion
54c Rear end portion
55 Magnet
56 Spring
56a E-ring
57 Hall sensor IC
58 Thermistor
59 Correction unit
59a Output characteristic correction unit
59b Temperature characteristic correction unit
59c Magnetic field change correction unit
81 Control unit
81A Control unit
81a Attached dust amount sensing unit
81b, 81c Remaining life calculation unit
82 Storage unit (storage)
83 Output unit
511, 512 Cavity
514 Bottom surface

The invention claimed is:

1. A filter life predicting apparatus comprising:
a differential pressure detector provided in a filtration device including a filtration member that filters a liquid, the differential pressure detector detecting a differential pressure as a pressure difference between a high pressure side and a low pressure side in the filtration device;
a storage that stores differential pressure characteristics, the differential pressure characteristics indicating a relationship between the differential pressure and an attached dust amount as an amount of dust attached to the filtration member, the differential pressure characteristics including information on a life of the filtration member; and
a life predicting unit comprising a processor,
wherein the differential pressure detection unit includes a spool, a magnet, a magnetic flux density detection element, and a correction unit, the spool is displaced according to the pressure difference, the magnet is provided on the spool, the magnetic flux density detection element detects a change in a magnetic flux density based on an amount of displacement of the magnet and outputs a first voltage according to the change in the magnetic flux density, and the correction unit corrects the first voltage into a second voltage proportional to the pressure difference, and
the life predicting unit obtains the remaining life based on the second voltage;
wherein the life predicting unit obtains a remaining life based on a first differential pressure detected by the differential pressure detector at a first time as a time while the filtration device filters the liquid and the differential pressure characteristics, the remaining life indicating how long the filtration member is usable after the first time;
wherein the differential pressure detector continuously detects the differential pressures, and
the life predicting unit continuously obtains remaining lives based on the continuously detected differential pressures to correct the remaining life based on obtained results; and
wherein the life predicting unit obtains a first remaining life and a second remaining life as the remaining lives, the first remaining life indicating how long the filtration member is usable after the first time, the second remaining life indicating how long the filtration member is usable after a second time based on a second differential pressure detected by the differential pressure detector at the second time prior to the first time and the differential pressure characteristics, and
the life predicting unit corrects the differential pressure characteristics based on an elapsed time between the second remaining life and the first remaining life in the differential pressure characteristics and an elapsed time between the second time and the first time, and corrects the first remaining life based on the corrected differential pressure characteristics.

2. The filter life predicting apparatus according to claim 1, wherein the storage stores a first differential pressure characteristic when a flow rate and a viscosity of the liquid are in a first condition, and a second differential pressure characteristic when the flow rate and the viscosity of the liquid are in a second condition as the differential pressure characteristics;
wherein the filter life predicting apparatus comprises a detector unit that acquires the flow rate and the viscosity of the liquid flowing into the filtration device; and
wherein the life predicting unit determines whether the flow rate and the viscosity acquired by the detector unit are closer to the first condition than the second condition or closer to the second condition than the first condition, the life predicting unit obtains the remaining life using the first differential pressure characteristic when the life predicting unit determines that the flow rate and the viscosity are closer to the first condition, and the life predicting unit obtains the remaining life using the second differential pressure characteristic when the life predicting unit determines that the flow rate and the viscosity are closer to the second condition.

3. The filter life predicting apparatus according to claim 2, wherein
the differential pressure characteristics indicate a relationship between the differential pressure and a time, and the differential pressure is obtained by measuring the differential pressure by filtering the liquid through the filtration device while dusts are continuously put into the liquid by a constant amount, the information on the life is a life-up time, the life-up time is an elapsed time in the differential pressure characteristics when the differential pressure is a terminal differential pressure, and the terminal differential pressure is found by adding a predetermined pressure to an initial differential pressure as the differential pressure before the dusts are put, and the life predicting unit obtains the remaining life based on a ratio between an elapsed time in the differential pressure characteristics at the first differential pressure and the life-up time.

4. The filter life predicting apparatus according to claim 1, wherein the differential pressure characteristics indicate a relationship between the differential pressure and a time, and the differential pressure is obtained by measuring the differential pressure by filtering the liquid through the filtration device while dusts are continuously put into the liquid by a constant amount, the information on the life is a life-up time, the life-up time is an elapsed time in the differential pressure characteristics when the differential pressure is a terminal differential pressure, and the terminal differential pressure is found by adding a predetermined pressure to an initial differential pressure as the differential pressure before the dusts are put, and the life predicting unit obtains the remaining life based on a ratio between an elapsed time in the differential pressure characteristics at the first differential pressure and the life-up time.

5. The filter life predicting apparatus according to claim 1, wherein the differential pressure detector includes a temperature detector, and the temperature detector acquires a temperature of the magnetic flux density detection element, and the correction unit corrects the first voltage based on the temperature acquired by the temperature detector.

6. A filtration device comprising:

a filtration member that filters a liquid; and a filter life predicting apparatus, wherein the filter life predicting apparatus includes:

a differential pressure detector that detects a differential pressure as a pressure difference between a high pressure side and a low pressure side in the filtration device, the differential pressure detector being provided in a filtration device including a filtration member that filters a liquid, the differential pressure detector detecting a differential pressure as a pressure difference between a high pressure side and a low pressure side in the filtration device;

a storage that stores differential pressure characteristics, the differential pressure characteristics indicating a relationship between the differential pressure and an attached dust amount as an amount of dust attached to the filtration member, the differential pressure characteristics including information on a life of the filtration member; and a life predicting unit comprising a processor, wherein the differential pressure detection unit includes a spool, a magnet, a magnetic flux density detection element, and a correction unit, the spool is displaced according to the pressure difference, the magnet is provided on the spool, the magnetic flux density detection element detects a change in a magnetic flux density based on an amount of displacement of the magnet and outputs a first voltage according to the change in the magnetic flux density, and the correction unit corrects the first voltage into a second voltage proportional to the pressure difference, and the life predicting unit obtains the remaining life based on the second voltage;

wherein the life predicting unit obtains a remaining life based on a first differential pressure detected by the differential pressure detector at a first time as a time while the filtration device filters the liquid and the differential pressure characteristics, the remaining life indicating how long the filtration member is usable after the first time;

wherein the differential pressure detector continuously detects the differential pressures, and the life predicting unit continuously obtains remaining lives based on the continuously detected differential pressures to correct the remaining life based on obtained results; and wherein the life predicting unit obtains a first remaining life and a second remaining life as the remaining lives, the first remaining life indicating how long the filtration member is usable after the first time, the second remaining life indicating how long the filtration member is usable after a second time based on a second differential pressure detected by the differential pressure detector at the second time prior to the first time and the differential pressure characteristics, and the life predicting unit corrects the differential pressure characteristics based on an elapsed time between the second remaining life and the first remaining life in the differential pressure characteristics and an elapsed time between the second time and the first time, and corrects the first remaining life based on the corrected differential pressure characteristics.

* * * * *